United States Patent [19]

Overzet

[11] 4,104,595
[45] Aug. 1, 1978

[54] SIGNAL TRANSLATING CIRCUIT FOR VARIABLE AREA CAPACITIVE PRESSURE TRANSDUCER

[75] Inventor: John Kenneth Overzet, Elmhurst, Ill.

[73] Assignee: Borg-Warner Corporation, Chicago, Ill.

[21] Appl. No.: 754,381

[22] Filed: Dec. 27, 1976

[51] Int. Cl.[2] .................. G01M 27/00; H03F 1/00
[52] U.S. Cl. ................................... 328/1; 331/65; 361/290
[58] Field of Search .................. 328/155; 307/308; 361/290, 292, 300, 321; 331/65; 340/258 C

[56] References Cited
U.S. PATENT DOCUMENTS

| 1,884,229 | 10/1932 | Rawls | 361/290 |
| 3,249,933 | 5/1966 | Vosteen | 361/300 |
| 3,729,991 | 5/1973 | Hardway, Jr. | 361/292 |
| 3,912,988 | 10/1975 | Levesque et al. | 361/290 |

Primary Examiner—Stanley D. Miller, Jr.
Assistant Examiner—B. P. Davis
Attorney, Agent, or Firm—James J. Jennings, Jr.

[57] ABSTRACT

An electrical circuit translates the capacitance change of a variable area capacitive transducer into a d-c voltage change. The transducer has two electrodes, and the surface of one electrode is anodized or otherwise provided with a dielectric layer. One of the two electrodes is nonlinear, having an apex point nearer the other electrode than the remainder of the electrode surface. As a force is applied to the deformable one of the two electrodes, there is a change in the effective contact area between the electrodes in accordance with the applied pressure, producing a resultant change in capacitance. The signal translating circuit produces a d-c output signal which varies as a function of the transducer capacitance change.

2 Claims, 5 Drawing Figures

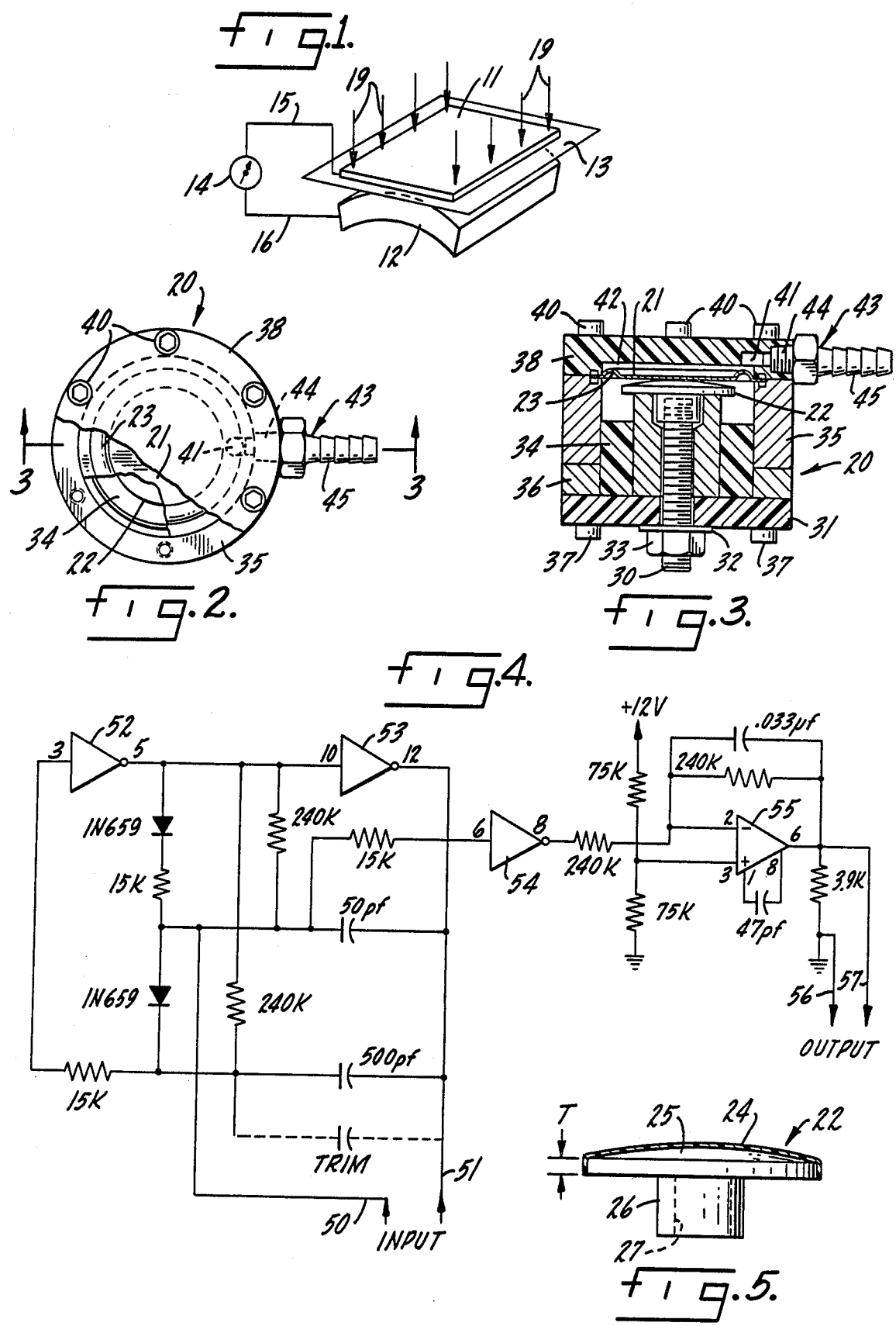

4,104,595

SIGNAL TRANSLATING CIRCUIT FOR VARIABLE AREA CAPACITIVE PRESSURE TRANSDUCER

BACKGROUND OF THE INVENTION

In the field of pressure transducers, there are different types of resistive and capacitor units commonly available. Such arrangements usually respond to an applied force by producing a physical displacement, to provide an electrical signal. The resistance element can change a contact position as a function of pressure. The capacitive element generally has a pair or set of metallic surfaces which responds to the applied force by changing either the spacing or the effective surface area. However these prior art devices generally require a complex mechanical assembly, in that a precise air space is usually provided.

The present invention is particularly useful with a variable area transducer of the capacitive type, in which the components can be fitted in an abutting relationship without the need to maintain a precise air gap or spacing.

It is a primary object of this invention to provide a signal translating circuit for producing a d-c output signal which varies as a function of changes in the transducer capacitance.

SUMMARY OF THE INVENTION

The circuit of this invention is particularly useful with a transducer assembly having a first electrically conductive member, capable of deformation, and a second electrically conductive member, substantially rigid and resistant to deformation, and spaced from the first member. The second member has an apex point on one surface; this apex point can be the highest point on a regular curved surface, or the highest projection or asperity of an irregular surface. A dielectric layer is provided in the space between the first and second electrically conductive members, by establishing a thin-film layer on one of the first and second members.

The signal translating circuit of the invention comprises an astable multivibrator circuit for providing a square-wave output signal. A capacitor connected in the multivibrator circuit regulates the duty cycle of the square-wave signal. A pair of electrical conductors are coupled between the transducer electrodes and the capacitor plates, to modify the duty cycle of the square-wave output signal as a function of a change in the effective capacity of the transducer. A buffer amplifier stage is coupled to the astable multivibrator, and an integrating circuit is connected to receive the square-wave signal from the buffer amplifier, to provide a d-c signal which varies with the variations in the duty cycle of the received square-wave signal. A pair of output conductors are connected to pass the d-c signal from the integrating circuit to associated equipment.

THE DRAWINGS

In the several figures in the drawings, like reference numerals designate like components, and in those drawings:

FIG. 1 is a perspective illustration of a simplified transducer assembly, useful in understanding the principles of transducer operation;

FIG. 2 is a top view, partially broken away, of a transducer assembly with which the present invention is particularly useful;

FIG. 3 is a sectional view, taken on the line 3—3 of FIG. 2, useful in understanding the component assembly of the structure illustrated in FIG. 2;

FIG. 4 is a schematic diagram, illustrating the circuit arrangement of this invention; and FIG. 5 is a side view of one electrode unit suitable for use in the embodiment illustrated in FIGS. 2 and 3.

GENERAL TRANSDUCER DESCRIPTION

FIG. 1 depicts a model used in the laboratory for producing a change in capacitance responsive to a change in the applied force. A force, represented by the arrows 19, is applied to the edges of deflection plate 11, which is deformed by the application of this force. The lower member 12 represents a second plate, and in this illustration is a section cut from a constant radius cylinder. Both the plates 11, 12 are electrically conductive and thus are analagous to the plates of a capacitor. The second member 12 is substantially rigid or resistant to deformation. A means for establishing a dielectric layer between the plates 11, 12 is provided. In this embodiment a Mylar sheet 13, about 1 mil (0.001 inch) in thickness was provided. The structure for retaining the dielectric layer abutting the plates 11, 12 is omitted from FIG. 1, the better to illustrate the basic principles.

With an increase of the force applied in FIG. 1, the resultant change in capacitance is observed on meter 14, coupled over line 15 to the upper plate 11 and over line 16 of the lower plate 12. The depicted arrangement successfully measured changes in pressure, as the pressure (or force) represented by the arrows 19 produced a change in the capacitance indicated by the meter 14.

SPECIFIC TRANSDUCER DESCRIPTION

FIGS. 2 and 3 depict a variable area capacitive transducer of a type useful with the present invention. As shown in these two figures, the transducer assembly 20 includes an upper capacitor plate 21 and a second or lower capacitor plate 22, supported in abutting relation. Upper plate 21 is the first electrically conductive member of the assembly, formed in a generally circular shape as shown of Ni-Span-C, a material exhibiting a very low thermal coefficient of elasticity. In addition the member 21 has a dimple or corrugation 23 between the large, substantially flat inner portion and the outer rim of this member, to assist in the thermal compensation of the complete unit. The second electrically conductive member 22 was made substantially rigid and resistant to deformation. As better shown in FIG. 5, the member 22 is made of aluminum and anodized in a conventional manner to provide a dielectric layer 24 in a position where it is "sandwiched" between the two electrodes in the transducer assembly. The showing in FIG. 5 is approximately twice the scale of FIG. 3, and the scale of FIG. 3 is close to that actually used in a demonstration model. In that model the head or anvil 25 was formed with a curvature of the upper surface equal to a portion of a sphere having a five inch radius, and the diameter of anvil 25 was about one inch. The center post portion 26 was attached to the plate 22 to facilitate its mounting in the complete assembly. The center post is bored and tapped, as indicated at 27, to receive the threads of a bolt 30, better shown in FIG. 3. In addition it is apparent that the thickness T of the electrode 22 can be varied in accordance with different structural requirements. In the preferred embodiment this dimension was about one-quarter inch.

As better illustrated in FIG. 3, bolt 30 extends from the lower portion of the post 26 through an insulating circular base member 31 of the transducer, and a washer 32 and nut 33 are affixed to the other end of the bolt 30. Those skilled in the art will appreciate that by adjusting the vertical position of the bolt 30, the intitial contact area between the plates 21, 22 can be set, thus to provide for capacitance changes either as a function of increasing or decreasing pressure. The base 31 is made of a clear insulating plastic, or glass or ceramic, and a spacer 34 of Teflon or a similar insulating material is provided. The main assembly housing is a steel sleeve 35, formed like a section of a cylinder. A circular spacer member 36 is provided, and formed of aluminum or other metal similar to that of the plate 22. It has been found that by making the vertical dimension of spacer 36 approximately equal to the vertical dimension T of the member 22 (FIG. 5), in conjunction with the corrugation of plate 21, good temperature compensation is provided for the complete assembly. The base member 30 of the assembly 20 is secured in place by a plurality of screws 37, which extend through base 31 and spacer 36, and are received in corresponding tapped holes in the housing 35.

Similarly at the top of the assembly is another plastic, insulating member 38 which functions as the cover plate. A plurality of additional screws 40 are provided to secure the cover plate 38 to the housing 35, clamping the outer periphery of the upper conductive member 21 firmly in place. The top plate 38 is cut out to define an opening 41 which communicates with the space 42 between the cover plate and the top of diaphragm 21. A hose connector 43 is provided, having a threaded portion 44 received in a tapped bore portion of the cover plate 38, and an outer projection 45 for receiving an air hose (not shown) or other suitable conduit. When assembled as shown any change in pressure applied to the connector 43 passes into the openings 41, 42 and is translated as a change in pressure between the cover plate 38 and the first electrically conductive member 21. This in turn produces a change in the area of contact between the members 21, 22 with a consequent change in the capacitance.

DETAILED DESCRIPTION OF THE INVENTION

The schematic diagram of FIG. 4 depicts the circuit arrangement of this invention, for producing a d-c output signal which varies as a function of the changing capacitance of the transducer assembly 20. As there shown the input signal to the circuit is received over conductors 50, 51. In practice one of these conductors is connected to the bolt 30 (FIG. 3) and thus makes electrical contact with the lower plate 22. The other lead was connected to the steel case 35, in physical engagement and thus electrical contact with upper plate 21. The variable area capacitance assembly thus is coupled in parallel with the 50 picofarad capacitor in the square-wave astable multivibrator including the stages 52, 53. This results in the passage of a square-wave signal over the buffer amplifier 54 to the integrating circuit including the IC stage 55, and the duty signal of the square-wave applied over stage 54 to the integrating circuit varies as a function of the capacitance value present on the input lines 56, 57, having an amplitude proportional to the capacitance of the pressure transducer 20.

In an embodiment built and tested the stages 52, 53 and 54 were physically enclosed in a single IC package, a CD4007AE. This is a package with 14 pin connectors, and the pin numbers are given at the input and output connections of the stage 52-54. In addition the 1 and 5 pins were tied together, and the 8 and 13 pins were also tied together. The other stage 55 was a CA3130S, with the pin connections as shown. In addition a 12 volt supply was provided, with the positive polarity connections being coupled to the 2, 11 and 14 pins of the CD4007AE, and to the 7 pin of the CA3130S. The negative side of the power supply was coupled to the 4, 7 and 9 pin connections of the CD4007AE package and to the 4 pin of the CA3130S, as well as to the points referenced by the ground symbols in FIG. 4. Other circuits may be designed to provide an output signal from the transducer assembly, but FIG. 4 illustrates a practical, proven circuit by which those skilled in the art can implement the present invention in conjunction with associated equipment requiring an electrical input signal.

TECHNICAL ADVANTAGES

The transducer assembly and signal translating circuit of the invention have been developed to withstand difficult environments, such as those found in the engine compartment of an automobile. The physical contact between the upper and lower capacitor plates, and removal of any requirement for maintaining an accurate dielectric spacing, contributes to the enhanced shock resistance. Measurements indicate that the change was accurate within ±3% over the temperature range of 0° to 100° C., and accurate to ±6% over the temperature range from −40%° C. to +125° C. The signal circuit of this invention exhibited an accuracy of ±2.5%, considering changes in the output signal voltage against changes of input capacitance, over the temperature range from −40° C. to +125° C. when energized a nominal 12 volt supply voltage. The transducer assembly was life tested to 100,000 cycles over the full pressure range, and its performance was stable to within 2%.

While only a particular embodiment of the invention has been described and claimed herein, it is apparent that various modifications and alterations of the invention may be made. It is therefore the intention in the appended claims to cover all such modifications and alterations as may fall within the true spirit and scope of the invention.

What is claimed is:

1. The combination of a variable area capacitive transducer of the type having two electrodes abutting each other, with a thin-film layer applied to one of the electrodes as a dielectric layer, and a signal translating circuit comprising:
   an astable multivibrator circuit for providing a square-wave output signal;
   a capacitor, connected in the multivibrator circuit to determine the duty cycle of the square-wave signal;
   a first conductor coupled between one of the transducer electrodes and one plate of said capacitor, and a second conductor coupled between the other transducer electrode and the other plate of said capacitor, to modify the duty cycle of the output signal as a function of a change in the effective capacity of the transducer;
   an integrating circuit connected to receive the square-wave signal and to provide a d-c signal which varies with the variations in the duty cycle of the received square-wave signal; and
   a pair of output conductors connected to pass the d-c signal from the integrating circuit to associated equipment.

2. The combination claimed in claim 1, and further comprising a buffer amplifier stage coupled between the astable multivibrator and the integrating circuit.

* * * * *